United States Patent [19]
Ouellette

[11] Patent Number: 5,896,977
[45] Date of Patent: Apr. 27, 1999

[54] BELT AND PULLEY CONVEYOR

[75] Inventor: Joseph F. Ouellette, Glendale, Mo.

[73] Assignee: Ouellette Machinery Systems, Inc., Fenton, Mo.

[21] Appl. No.: 08/691,506

[22] Filed: Aug. 2, 1996

Related U.S. Application Data

[63] Continuation-in-part of application No. 08/292,079, Aug. 17, 1994, Pat. No. 5,611,647.

[51] Int. Cl.$^6$ ..................................................... B65G 47/24
[52] U.S. Cl. ......................................... 198/415; 198/626.5
[58] Field of Search .................. 198/415, 460.1, 198/461.3, 604, 626.5, 626.1

[56] References Cited

U.S. PATENT DOCUMENTS

| | | | |
|---|---|---|---|
| 2,205,702 | 6/1940 | Stewart et al. | 198/626.5 |
| 3,850,284 | 11/1974 | Roberts | 198/604 |
| 4,269,305 | 5/1981 | Fryatt | 198/781.1 |
| 4,360,098 | 11/1982 | Nordstrom | 198/460.1 |
| 4,934,510 | 6/1990 | Lutgendorf | 198/461.3 |

*Primary Examiner*—Joseph E. Valenza
*Attorney, Agent, or Firm*—Howell & Haferkamp, L.C.

[57] ABSTRACT

The present invention pertains to an improved belt and pulley conveying apparatus for conveying bottle containers. The conveying apparatus comprises a set of belts each driven by a pair of pulleys with a lateral spacing between the belts dimensioned to receive bottle containers therebetween. The belts engage the bottle containers and convey them from an input conveyor to a diverter assembly. The apparatus includes a plurality of motor driven shafts, each shaft having a plurality of the pulleys adjustably mounted thereon. The positions of the belts are horizontally and vertically adjustable thereby allowing the conveyor to accommodate containers of various dimensions.

20 Claims, 8 Drawing Sheets

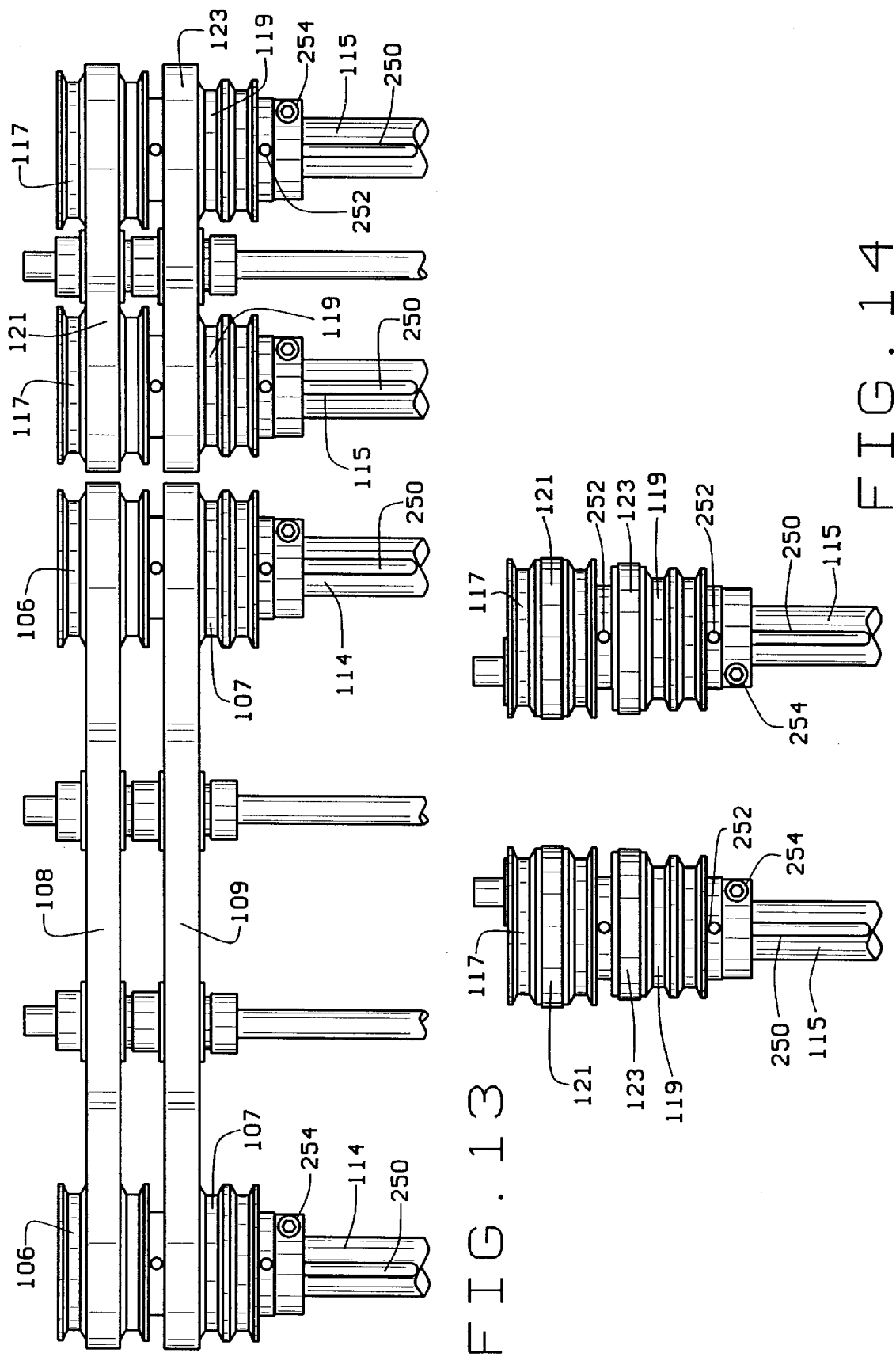

BELT AND PULLEY CONVEYOR

This application is a continuation-in-part application of application Ser. No. 08/292,079 filed Aug. 17, 1994, now U.S. Pat. No. 5,611,647.

BACKGROUND OF THE INVENTION

The present invention pertains to improvements to an air conveyor of the type disclosed in U.S. patent application Ser. No. 08/062,939, filed May 13, 1993, assigned to the assignee of the present invention, issued on Aug. 1, 1995 as U.S. Pat. No. 5,437,521, and incorporated herein by reference. More particularly the present invention pertains to an air conveyor that conveys a stream of bottles along an input path and then selectively diverts bottles from the stream into one of two or more output paths.

An air conveyor is useful for the rapid transport of plastic bottles between work stations as, for example, between a storage station and a bottle-filling station. Typically, the known air conveyor includes a pair of flanges spaced to define an elongated slot between them, and a series of air ducts on opposite sides of the slot. Plastic bottles are formed with annular rims adjacent the tops of their necks. With the bottle necks extending through the slot and the rims overlying the spaced flanges, the bottles are suspended from the flanges and hang below the slot. Pressurized air from the ducts is directed in streams toward the bottles. The bottles move through the slot because of the force of the air streams against the bottles. Preferably, the bottles are conveyed in closely spaced succession.

In at least some of the conventional air conveyors, the air is directed through a plenum within a channel and against the tops of the bottles above their annular rims. This results in turbulence of air emerging through the elongated slot causing fluttering of the bottles and forward and backward wobbling as they are blown in the direction of bottle flow. Frequently, this wobbling will cause the bottles to wedge against one another.

The known air conveyors for plastic bottles are also deficient because once the bottles accumulate, the force of air required to move the slug (accumulated bottles) as a group must be high to overcome the drag. Therefore, the air pressure kept in the plenum is high enough to overcome the friction drag force of a slug should one occur. Consequently, as single or spaced bottles are conveyed by this high air pressure, their speed accelerates to a high velocity. This high acceleration and velocity is detrimental because the bottles collide at high speed with other bottles that have stopped or accumulated downstream potentially damaging the bottles. Conversely, if the force of air is reduced to prevent high acceleration of single bottles to prevent high speed impact, the reduced air flow will be inadequate to move the slugs (accumulated bottles).

In the prior art, much has been done in attempts to control the force of air to convey bottles at high speed yet avoid high speed impacts, such as modulation of the blower speed, which requires motor speed controls. However, reaction time in depleting the air stored in the plenum as well as in replenishing air blown within the plenum is rather slow compared to the more immediate response required in high speed production lines. In other prior art, louvers have been installed in the walls of the plenum in an effort to control the speed of single (random) bottles while applying greater force against the slugs. However, since accumulated slugs can and do occur randomly at any place along a given conveyor span, the complexity of such applications becomes neither economical nor practical.

SUMMARY OF THE INVENTION

An objective of this invention is to provide an air conveyor that, in a practical and economical manner, moves the bottles along the path between work stations at a generally constant speed and maintains a small generally constant space between adjacent bottles and automatically slows the speed of a conveyed bottle as it approaches one or more stalled or stopped bottles, thereby avoiding high speed impact of bottles. It is also an objective of the invention to provide a diverter in line with an input air conveyor and at least two output air conveyors where the diverter is automatically controlled to direct bottles conveyed along the input conveyor to one of the output conveyors.

The air conveyor of the present invention can move plastic bottles at a substantially constant speed and automatically slow the speed of bottles as they approach stopped bottles or bottles moving at a slower speed. Moreover, the air conveyor apparatus of the invention can divert conveyed bottles from an input conveyor to one of two or more separate output conveyors.

The bottles conveyed by the apparatus of the invention are generally of the conventional type of plastic bottle used as a container for carbonated beverages and other types of beverages. The bottles usually have an upper throat opening that is usually threaded on its exterior for receiving a cap. As the bottle extends downwardly from the throat, it tapers outwardly along a neck to an annular shoulder defining the upper portion of the main receptacle or body of the bottle. An outwardly projecting annular rim or ring surrounds the bottle separating the threaded throat from the tapered neck. Plastic bottles of this type are provided in a variety of sizes and configurations.

The air conveyor apparatus of the present invention is basically comprised of an input air conveyor and a pair or more of separate, output air conveyors. A diverter assembly is positioned between the input conveyor and the multiple of output conveyors. The diverter can be manually or automatically controlled to direct a stream of bottles conveyed in a downstream path by the input conveyor to either one of the separate output conveyors for continued downstream travel of the stream of bottles.

The input and the multiple of output air conveyors are constructed similar to each other and similar to the air conveyor disclosed in U.S. Pat. No. 5,437,521. However, the input and output air conveyors of the present invention include several improvements over previous air conveyors. The air conveyors are constructed as channels having a top wall and pairs of laterally spaced downwardly depending sidewalls. Together, the top wall and sidewalls give the channel of the conveyor a general, inverted-U shaped configuration. An air plenum extends along the top of the channel top wall. A plurality of air ducts extend through the channel top wall and sidewalls. Each duct extends from and communicates with the interior of the conveyor plenum to a pair of port openings that exit the channel sidewalls into the interior volume of the channel. Laterally projecting flanges extend from the pair of channel sidewalls into the channel interior volume. Distal edges of the flanges are laterally spaced from and mutually oppose each other defining a slot of the air conveyor therebetween. The spacing between the flange edges defining the slot is sufficiently large to receive the neck of a bottle container therein with the annular rim of the bottle resting on the top surfaces of the opposed flanges and the body of the bottle suspended below the pair of flanges. A first port opening of each of the air ducts exits the channel sidewall in the interior of the channel below the pair of flanges. This first port opening ejects a jet of air transmitted through the air duct from the conveyor plenum. The jet of air is directed against the bottle container suspended from the flanges and forces the bottle container along the slot defined between the pair of flanges. The orientation of the first port opening relative to the conveyor slot is such that the jet of air ejected from the first port opening will cause the bottle suspended in the slot to be conveyed along the slot in a desired downstream direction.

The second port opening of the air duct exits the channel sidewall into the channel interior above the pair of flanges. The air duct communicating the interior of the conveyor plenum with the first port opening is specifically configured so that all of the air passed through the duct from the plenum exits the first port opening and is not directed to the second port opening. The specific configuration of each air duct creates a venturi effect in the duct that draws a vacuum pressure through the second port opening from the interior volume of the conveyor channel above the pair of flanges. This vacuum created in the channel interior volume above the flanges exerts an upward pulling force on the bottle container suspended from its annular ring in the slot and thereby reduces the friction drag of the portion of the container annular ring supported on the conveyor channel flanges. This reduction in friction drag enables the input and output conveyors of the invention to convey bottle containers at increased speeds while avoiding jamming of the bottle containers in the conveyors. The reduced friction force exerted by the bottle containers on the flanges of the conveyor also reduces wear on these flanges through use of the conveyor.

To further reduce the wear exerted on the flanges of the input and output conveyors of the invention and to also further increase the speed at which bottle containers may be conveyed by the conveyors, the support surfaces of the conveyor flanges that support the annular rings of the bottle containers have polymeric surfaces. In the preferred embodiment, the annular flanges that project from the conveyor channel sidewalls are coated with a polymer. This eliminates the need for polishing the surfaces of the flanges that support the annular rings of the bottle containers to reduce the friction of the supporting flange surfaces and thereby reduces the costs of manufacturing the conveyors.

The specific configuration of each air duct as it approaches the first port opening also causes a bottle conveyed by the first port openings along the slot of the conveyor to automatically decrease its conveyed speed as it approaches a stationary or slower moving bottle container in the conveyor. Each of the first port openings are oriented so that they direct a jet of air outwardly from the first port opening beneath the pair of conveyor flanges toward the sides of the bottle container suspended in the conveyor slot. The direction of the air jet from the first port opening is such that if the bottle container is slowed or stopped in the conveyor slot a portion of the air jet from the first port openings will be directed upwardly into the conveyor slot. This portion of the air jets from the first port openings directed into the conveyor slot negates a portion of the vacuum created in the conveyor interior volume above the slot due to the effect of the second port openings. As the vacuum in the channel interior above the slot is reduced, the friction force of the container annular rims supported on the top surfaces of the conveyor flanges is increased. This increase in the friction force of the container rims on the conveyor flanges automatically causes the conveyed bottle containers to decrease their conveyed velocity as they approach a slower moving or stopped bottle container in the conveyor.

The diverter plate assembly of the invention positioned between the input conveyor and the pair of output conveyors is basically comprised of a pair of directional slots formed in a plate with pluralities of nozzle heads arranged along opposite sides of the two directional slots. The diverter plate assembly includes a mechanism that can be automatically controlled or manually controlled to move laterally relative to the input conveyor and pair of output conveyors between first and second positions. In the first position of the diverter plate relative to the input and output conveyors, a first directional slot of the pair aligns with the input conveyor slot and a first approach slot that leads to the first output conveyor slot of the output conveyors. In the second position of the diverter plate relative to the input and output conveyors, a second directional slot of the pair aligns with the input slot and a second approach slot that leads to the second output slot of the pair of output conveyors. By shifting the diverter plate laterally between its first and second positions relative to the input and output conveyors, the stream of bottle containers conveyed in an upstream direction along the input conveyor slot can be directed into either the first or second output conveyor slots as desired. Where more than two output conveyors are employed, the diverter plate can be modified to feed a stream of bottles into any one of the multiple of output conveyors.

The diverter plate assembly includes a feed slot that receives the stream of bottle containers from the input conveyor. Positioned on each side of the feed slot is a system of pulley driven belts which engage the bottle containers as they are fed into the slot from the input conveyor and which convey the containers to the diverter plate. The system of pulley driven belts includes a first upstream set of belts and a second downstream set of belts that are controlled to start and stop together. The first set of pulley driven belts, spaced laterally from one another on opposite sides of the feed slot, receive the bottle containers fed into the feed slot from the input conveyor. This first set of belts hold back the line pressure from the infeed conveyor. The second set of belts runs slightly faster than the first set of belts to create a small desirable gap between the bottles. Together the first and second sets of belts stop to allow bottles to clear the diverter, then to allow the diverter to switch to another output conveyor, and then both belts restart together.

The second set of pulley driven belts are laterally spaced on opposite sides of the feed slot and travel at a faster speed than the first set of belts, thereby creating a different spacing between containers as they are transferred from the first set of belts to the second set. Preferably, the second set of pulleys runs twenty-five percent (25%) faster than the first set of pulleys creating a quarter bottle gap (¼ the width of a bottle) between adjacent bottles.

Both the first and second sets of belts include at least a pair of lower belts, laterally spaced on opposite sides of the feed slot, which engage a lower portion of the bottle containers, and at least a pair of upper belts, laterally spaced on opposite sides of the slot, which move slightly faster than the lower belts and engage an upper portion of the bottle containers. The pulleys driving the upper belts and the pulleys driving the lower belts are mounted on common shafts. The upper pulleys have slightly larger diameters than the lower pulleys, thereby causing the upper belts to move slightly faster than the lower belts. This serves to properly position the bottle containers with their necks slightly forward of their bodies as the bottle containers are conveyed through the two sets of belts to the diverter plate.

Additionally, a plurality of orientation air jets are positioned above and below the feed slot between the second set of belts. These orientations jets eject jets of air that, in lieu of or in cooperation with the belts, serve to position the bottle containers with their necks positioned slightly forward of their bodies. It has been found that this particular orientation of the bottle containers prevents jamming as they enter the diverter assembly. The second set of belts feed the bottle containers to the diverter plate.

A pair of diverter nozzles are positioned on opposite sides and below the diverter plate. The pair of diverter nozzles assist the diverter plate in directing the stream of bottle containers received from the input conveyor to one of the two or more output conveyors. The diverter nozzles are positioned to selectively eject jets of air in opposite lateral directions. The ejected jets of air from the nozzles impinge on the opposite lateral sides of a bottle container as it exits one of the two directional slots of the diverter plate and enters approach slots to one of the two output air conveyors. The jet of air hitting the bottle orients or positions the bottom of the bottle body toward the approach slot leading to the output conveyor and thereby assists in the transfer of the bottle container from the diverter plate to the downstream air conveyor.

BRIEF DESCRIPTION OF THE DRAWINGS

Further objects and features of the present invention are revealed in the following detailed description of the preferred embodiment of the invention and in the drawing figures wherein:

FIG. 8 is taken at section line 8—8 in FIG. 7;

FIG. 11 is taken at section line 11—11 in FIG. 10;

FIG. 13 is a right side elevation view of the improved belt and pulley conveyors of the present invention; and FIG. 14 is an end elevation view of the improved belt and pulley conveyors of the present invention looking upstream of the conveyed path of bottle containers.

DESCRIPTION OF THE PREFERRED EMBODIMENTS

Figure 1:
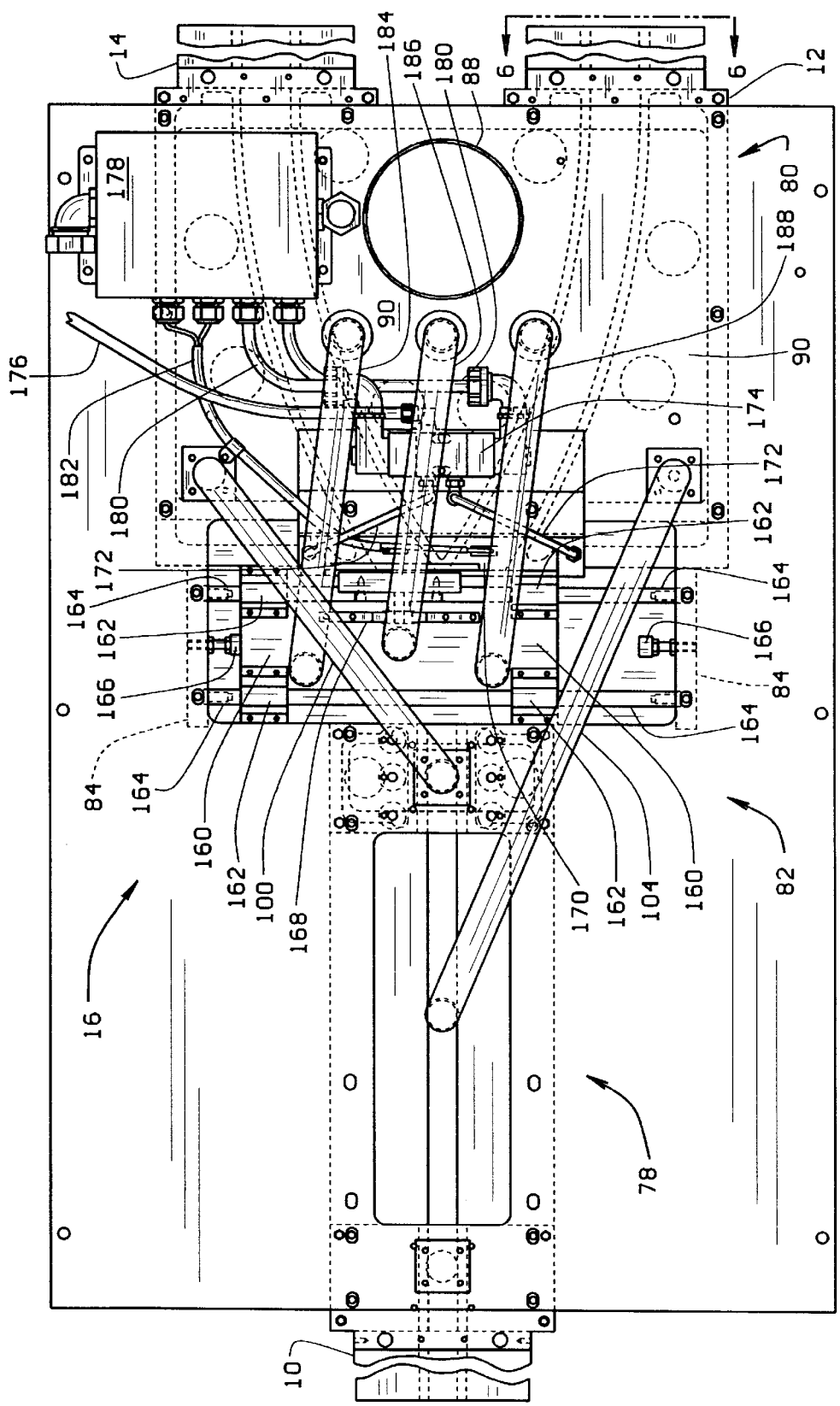
FIG. 1 is a top elevation view of the conveyor apparatus of the invention including the input air conveyor, the diverter assembly, and the pair of output air conveyors.
Figure 2:
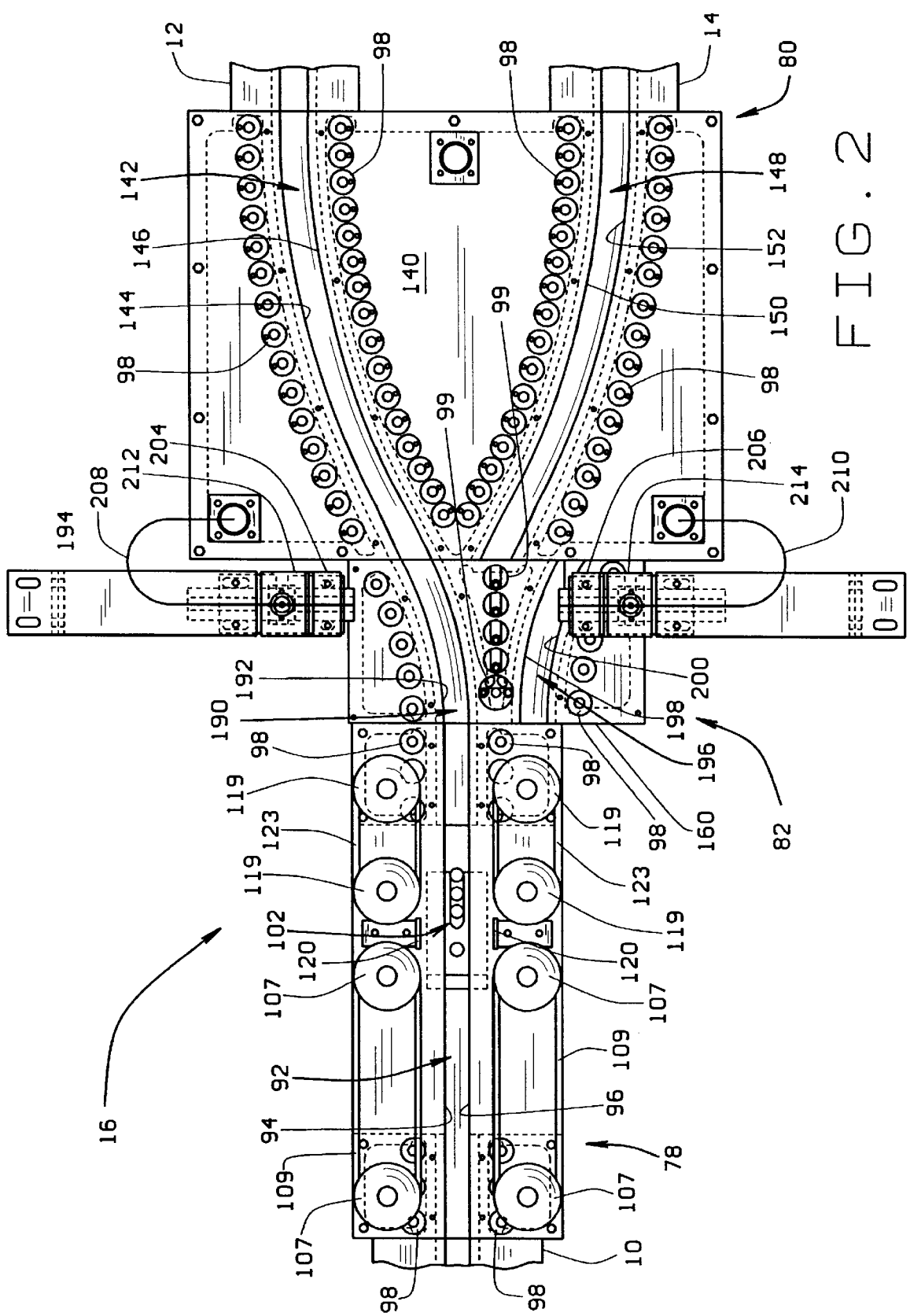
FIG. 2 is a bottom plan view of the diverter assembly.

The air conveyor apparatus of the present invention is an improvement over air conveyors of the type disclosed in co-pending U.S. patent application Ser. No. 08/062,939, filed May 13, 1993, issued Aug. 1, 1995 as U.S. Pat. No. 5,437,521, assigned to the assignee of the present invention, and incorporated herein by reference. The apparatus of the invention is basically comprised of an input air conveyor 10, a first output air conveyor 12, a second output air conveyor 14, and a diverter assembly 16 positioned between the input conveyor 10 and the two output conveyors 12, 14. It should be understood that the diverter assembly of the invention may be employed with other types of air conveyors currently known in the prior art. Each of these basic component parts of the invention is shown in their relative positions in FIGS. 1 and 2 of the drawing figures. In FIGS. 1 and 2, the air input conveyor 10 and output air conveyors 12, 14 are shown as schematic representations for simplicity. The lengths of these three conveyors are also shown truncated in FIGS. 1 and 2. It should be understood that the overall length of the input air conveyor 10 and two output air conveyors 12, 14 can vary depending upon the environment in which the apparatus of the invention is employed. In certain situations, it may be necessary that the input air conveyor be longer than the two output air conveyors or vice versa. Furthermore, in other situations, it may be necessary that the two output air conveyors have different overall lengths. It should be understood that the construction of the input air conveyor 10 and the two output air conveyors 12, 14 are identical and certain structural features of these conveyors repeat along the lengths of these conveyors. Therefore, a description of only a short length of one of the conveyors is necessary for an understanding of how any length would be constructed and operated. Furthermore, the drawings of the diverter assembly 16 show component parts of the assembly in schematic representation as well as truncated depictions to simplify the drawings and reduce clutter while still providing a sufficient description of the subject matter of the invention that would enable the ordinary skilled artisan to make and use the same.

Figure 6:
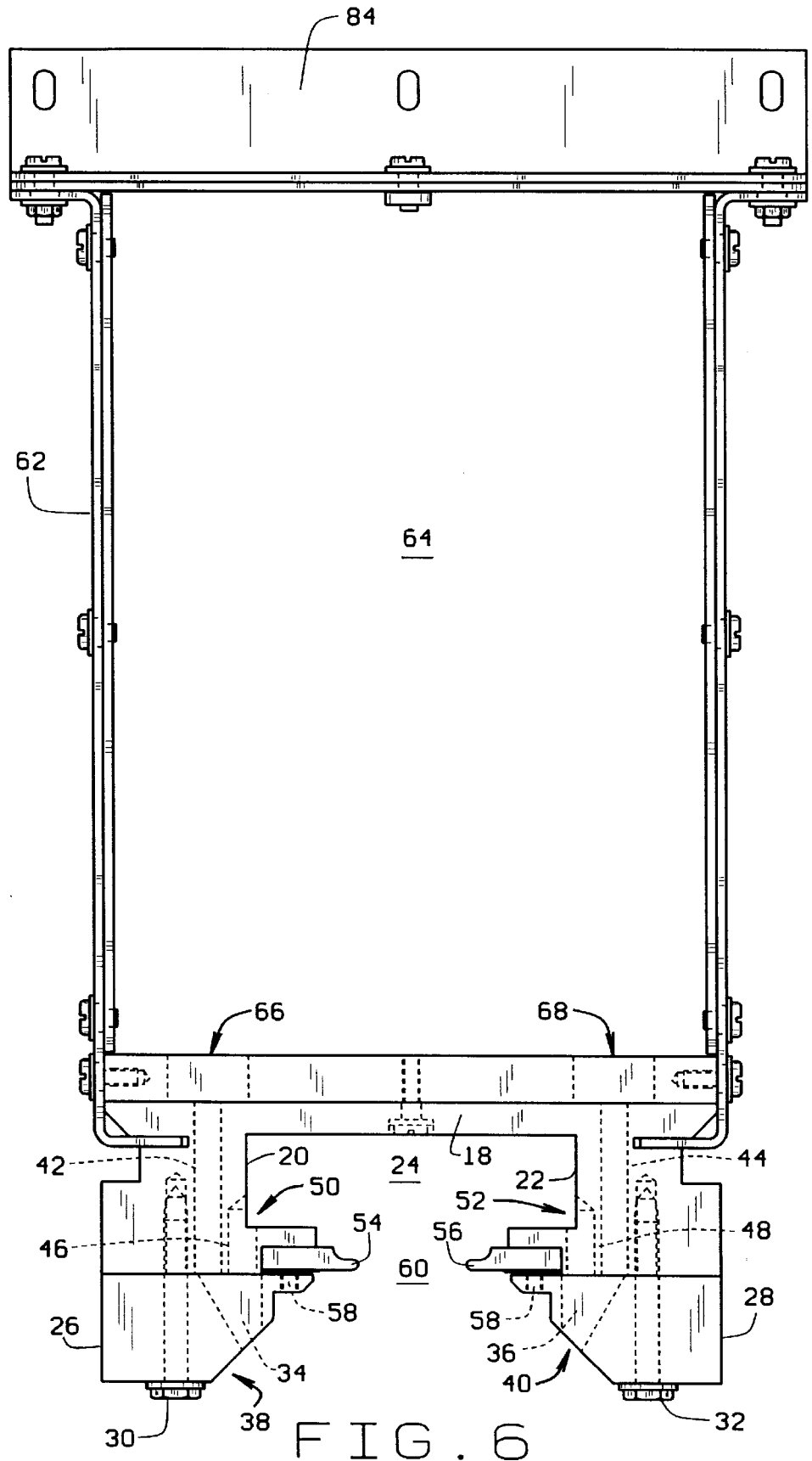
FIG. 6 is an end view of the construction of the input and pair of output air conveyors, taken at line 6—6 in FIG. 1.
Figure 7:
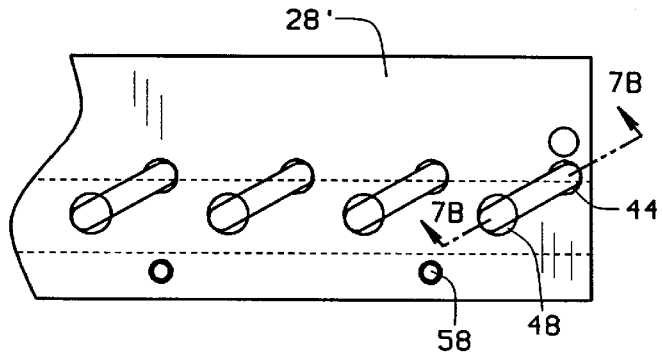
FIGS. 7, 8, and 9 show specific structural features of one embodiment of the air conveyor of the invention.
Figure 9:
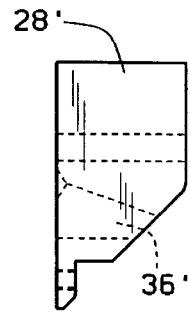
Figure 8:
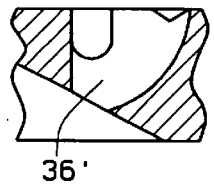
Figure 10:
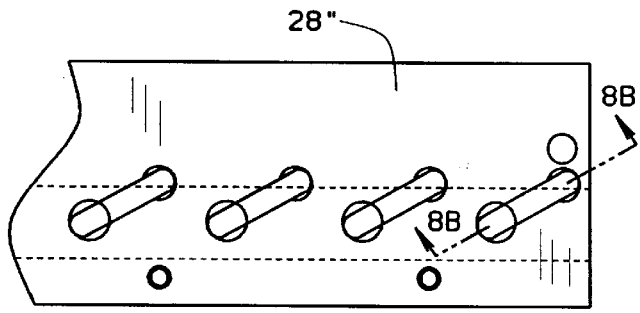
FIGS. 10, 11, and 12 show specific structural features of a further embodiment of the air conveyor of the invention.
Figure 12:
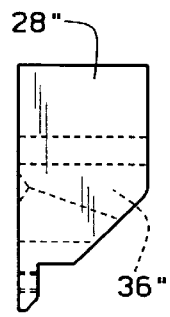
Figure 11:
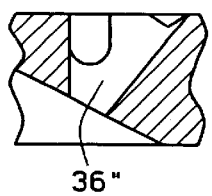

Referring now to the construction of the air conveyors of the present invention, as stated earlier, the construction of the input air conveyor 10 and the first and second output air conveyors 12, 14 is similar and only one of the air conveyors, the first output air conveyor 12, will be described in detail. FIG. 6 shows an end view of the output air conveyor 12. The conveyor includes a conveyor channel having a top wall 18 and laterally spaced sidewalls 20, 22. As seen in FIG. 6, together the top wall 18 and sidewalls 20, 22 have a general, inverted-U shaped configuration surrounding an interior volume 24 of the conveyor channel. The sidewalls 20, 22 of the conveyor channel have lower sections, 26, 28, respectively, connected to the upper portions of the sidewalls by threaded fasteners 30, 32. The two lower sections of the sidewalls 26, 28 have lower portions 34, 36 of pluralities of air ducts that extend through the conveyor channel sidewalls. FIG. 8 shows the cross section configuration of one of the duct lower portions 36'. FIGS. 10–12 show a variant embodiment of the lower duct portion with the lower section referenced as 28" and the lower portion of the one of the plurality of air ducts referenced as 36". FIG. 11 shows the variant embodiment of the duct lower portion having a different configuration. The configurations of the duct lower portions are similar in that they direct jets of air out through jet port openings 38, 40 of the air ducts that strike bottle containers conveyed by the air conveyor in the area of the shoulder of the containers forcing the containers to travel downstream along the length of the air conveyor.

Each of the lower portions of the air ducts 34, 36 are fed with pressurized air conveyed through upper portions of the ducts 42, 44 that extend through the upper portions of the conveyor channel sidewalls 20, 22. As seen in FIG. 6, these upper portions 42, 44 of the air ducts extend from the top surface of the conveyor channel top wall 18 completely through the channel sidewalls 20, 22 to the duct lower portions 34, 36.

Branch portions 46, 48 of the air ducts extend partially through the upper portions of the sidewalls 20, 22 and exit the sidewalls into the conveyor channel interior 24 through vacuum port openings 50, 52. These branch portions of the air duct 46, 48 communicate with the duct lower portions 34, 36. As pressurized air passes through the air ducts 42, 44 in the sidewalls and then through the lower duct portions 34, 36 exiting the jet port openings 38, 40, a venturi effect is created in the duct lower portions 34, 36 that draws a suction through the branch portions 46, 48 that exit the sidewalls at the vacuum openings 50, 52 in the channel interior volume 24. This suction reduces the air pressure in the upper portion of the channel interior volume 24.

The channel interior volume 24 is divided into an upper portion and a lower portion by a pair of laterally projecting flanges 54, 56 that extend from the pair of channel sidewalls 20, 22 into the channel interior volume 24. As seen in FIG. 6, the flanges 54, 56 are held securely in their positions in the interior of the conveyor channel by a plurality of set screws 58. The opposed distal edges of the flanges are laterally spaced from each other defining a slot 60 of the air conveyor therebetween. The lateral width of the slot 60 is sufficiently large to receive the neck of a bottle container therein with the annular rim of the bottle supported on the top surfaces of the opposed flanges 54, 56 and the body of the bottle suspended below the pair of flanges. In the preferred embodiment of the invention, at least the top support surfaces of the pair of flanges 54, 56 that come into contact with the annular ring of a bottle container supported by the flanges are coated with a polymeric material such as TUFRAM® or NEDOX®, which are registered trademarks of General Magnaplate Corporation for metal coatings. Other types of polymer coatings may be employed. Polymer coatings of this type protect the base metal of the flanges 54, 56 from wear over use of the air conveyor and also provide a slick support surface on the flanges that has less friction resistance to the conveyance of the bottle container annular rings thereover than does a polished metal surface such as polished stainless steel.

An air plenum 62 extends along the top wall 18 of the conveyor channel. The interior 64 of the plenum communicates through pluralities of openings 66, 68 in splice plates at the bottom of the plenum and through the pluralities of air ducts 42, 44 spatially arranged along the length of the conveyor channel and the conveyor slot 60. Air is supplied at a regulated pressure to the plenum interior volume 64 by a conventional blower (not shown). The air pressure supplied to the plenum interior is directed through the plenum openings 66, 68 and the sidewall air ducts 42, 44 and is ejected from the jet port openings 38, 40. The jets of air ejected from the port openings 38, 40 cause the bottle suspended in the slot 60 to be conveyed along the slot in a desired downstream direction. The venturi effect created in the air ducts draws a vacuum pressure through the vacuum port openings 50, 52 which open into the interior volume 24 of the conveyor channel above the pair of flanges 54, 56. This vacuum created in the channel interior volume above the flanges exerts an upward pulling force on the bottle container suspended from its annular ring in the slot and thereby reduces the friction drag of the portion of the bottle annular ring supported on the conveyor channel flanges 54, 56. This reduction in friction drag enables the input and output conveyors of the invention to convey bottle containers at increased speeds while avoiding jamming of the bottle containers in the conveyors. The reduced friction force exerted by the bottle containers on the flanges of the conveyor also reduces wear on these flanges.

The specific configuration of each air duct as it exits the jet port openings 38, 40 also causes a bottle container conveyed by the jet port openings along the slot of the conveyor to automatically decrease its conveyed speed as it approaches a stationary or slower bottle container moving along the slot of the conveyor. The jet port openings 38, 40 are oriented so that they direct a jet of air inwardly beneath the pair of conveyor flanges 54, 56 towards the shoulder areas of the bottle container suspended in the conveyor slot. The direction of the air jet from the jet port openings is such that if a bottle container is slowed or stopped in the conveyor slot, portions of the air jets from the jet port openings 38, 40 will be directed against the shoulder area of the stopped bottle container and will be directed by the shoulder area upwardly into the conveyor slot 60. This portion of the air jets from the jet port openings that is directed into the conveyor slot 60 negates a portion of the vacuum created in the conveyor interior 24 above the flanges 54, 56 in the area of the stopped bottle container. As the vacuum in the channel interior volume 24 above the slot in the area of the stopped bottle is reduced, the friction force of a second bottle container annular ring supported on the flange top surfaces and approaching the stopped bottle is increased. This increase in the friction force of the approaching bottle container rim on the conveyor flanges automatically causes the conveyed bottle container to decrease its conveyed velocity as it approaches the stopped bottle container in the conveyor. In this manner, the air conveyors of the present invention automatically control the speed of conveyed bottle containers to reduce high speed impact of a moving bottle container with a stopped or slower moving bottle container.

The bottle container diverter that receives bottles from the input air conveyor and diverts these bottles to the first and second output air conveyors is shown in FIGS. 1–5 of the drawing figures. The diverter is basically comprised of three sections, a feed section 78 that receives the bottle containers from the input air conveyor 10, an output conveyor approach section 80 that delivers bottle containers to the two output conveyors 12, 14 and a diverter section 82 positioned between the feed section and the output conveyor approach section which either selectively or automatically diverts bottles received from the input air conveyor 10 to the two output air conveyors 12, 14. Like the input and output air conveyors, the component parts of the diverter assembly 16 are all supported on a frame 84 that provides easy access to the component parts for servicing or adjustment.

The feed section, diverter section, and output conveyor approach section all have pluralities of air jet nozzles that eject jets of air to convey pluralities of bottle containers through the three sections. The supply of air is provided by a large blower 86 that is mounted on top of the frame 84. The blower 86 communicates through a large hose 88 with a manifold housing 90 mounted on the frame. Pluralities of hoses, shown schematically in the drawings for simplicity and to reduce clutter, distribute the air from the manifold 90 to the various areas of the diverter assembly.

Referring to FIG. 2 which shows the underside of the diverter assembly 16, the feed section 78 of the assembly includes a slot 92 between opposed flanges 94, 96. The slot, in cross section, is configured very similar to the slot of the air conveyors except that it does not include the vacuum port openings or jet port openings of the air conveyors. Pluralities of air jet heads 98 are positioned on opposite sides of the slot 92. The construction of these air jet heads 98 is similar to that disclosed U.S. Pat. No. 5,437,521, referenced earlier. However, in the preferred embodiment of the invention, the air jet heads 98 differ from those disclosed in the referenced co-pending application in that the jet openings of the heads are directed radially outward from the center of the cylindrical heads and do not have a downward directed component. Each of the jet openings of the heads 98 in the feed section 78 of the diverter assembly are directed toward the slot 92 but are angled slightly so they are also directed upstream, or from left to right as viewed in FIG. 2, to convey bottle containers through the slot 92 in the upstream direction. The six heads 98 positioned on opposite sides of the slot 92 adjacent the diverter section 82, are supplied with pressurized air through the hose 100 shown in FIG. 1 that communicates with the manifold 90. The six heads shown further downstream along the slot 92 may also be supplied with pressurized air from the manifold 90 or alternatively may be supplied with air from another source.

Positioned in the center of the slot 92 and above the slot so as not to interfere with the passage of the bottle container throats through the slot are three additional air jets 102. These jets are supplied with pressurized air through the hose 104 communicating with the manifold 90. These three jets positioned above the slot 92 direct jets of air downward on the throats of the bottle containers conveyed through the slot to ensure that the bottle containers reaching this point in the feed section 78 are properly positioned in the slot with their annular rims supported on the top surfaces of the flanges 94, 96 and are not raised up from the flanges. This is important for proper engagement of feed belts on the opposite sides of the conveyed bottle containers as will be described.

The feed section 78 of the diverter assembly also comprises two separate sets of pulley driven belts. The system of pulley driven belts includes a first upstream set of belts and a second downstream set of belts that are controlled to start and stop together. The first set of pulley driven belts is positioned at the upstream end of the feed slot 92 and includes pulleys 106, 107 and belts 108, 109. The pulleys 106, 107 are mounted on shafts 114 which are driven at constant speeds by motors 110 through a quick clutch/brake mechanism that controls and quickly stops and restarts the rotation of the pulleys 106, 107 as needed to control the flow rate and number of bottle containers conveyed through the feed slot 92 by holding back the stream of conveyed bottles when necessary. The shafts 114 are driven from the clutch/brake mechanism 112 through a transmission 116. This first set of belts hold back the line pressure from the infeed conveyor. The second set of belts runs slightly faster than the first set of belts to create a small desirable gap between the bottles. Together the first and second sets of belts stop to allow bottles to clear the diverter, then to allow the diverter to switch to aother output conveyor, and then both belts restart together.

As best seen in FIGS. 2, 4, 13, and 14, each shaft 114 is provided with a plurality of pulleys 106, 107. The pulleys 106, 107 may be mounted at any point along the vertical length of the shafts 114. Set screws 254 are employed for securing the pulleys 106, 107 to the shafts 114. The set screws 254 may be loosened and tightened for adjusting the location of the pulleys 106, 107 along the vertical length of the shafts 114. Each pulley uses a key-keyway arrangement which comprises an elongated groove 250 disposed lengthwise along the exterior of each shaft 114 and a key 252 on each pulley which engages the groove 250 when the pulley is mounted on the shaft 114. The key-keyway arrangements are employed to prevent slippage of the pulleys 106, 107 relative to the shafts 114 when the shafts 114 are driven by motors 110.

The plurality of pulleys 106, 107 provided on each shaft 114 enables the vertical positions of the belts 108, 109 to be adjusted by positioning the belts 108, 109 over different pairs of pulleys 106, 107 which are adjustably mounted along the vertical lengths of the shafts 114 in different horizontal planes. Alternatively, the vertical positions of the belts 108, 109 may be adjusted by loosening set screws 254 and moving the pulleys 106, 107 to different locations along the vertical lengths of the shafts 114. The horizontal position of the belts 108, 109 may be adjusted by looping the belts over different pairs of pulleys 106, 107 having various diameters. This vertical and horizontal adjustability enables the feed section 78 of the diverter assembly 16 to be adapted for use with a variety of different bottle containers having different sizes and configurations.

As the bottles are conveyed through the slot 92 and exit from between the first set of pulleys 106, 107 and belts 108, 109 they are next engaged by a second set of pulley driven belts. A pair of anti-wobble guides 120 between the two sets of pulleys guides the bottles and prevents their wobbling from side to side as they are transferred to the second set of pulley driven belts. The second set of pulley driven belts includes a pair of upper belts 121 laterally spaced on opposite sides of the feed slot and a pair of lower belts 123 below the upper belts 121. The upper belts are wrapped around a set of upper feed pulleys 117 and the lower belts are wrapped around a set of lower feed pulleys 119. The pulleys 117 and 119 are mounted on common shafts 115. The shafts 115 are driven from the clutch/brake mechanism 112 through a transmission 122. This set of belts conveys the bottle containers through the remainder of the feed slot 92 and delivers the containers to the diverter section 82 of the assembly 16. The positions of the belts 121, 123 on the pulleys 117, 119 may also be vertically and horizontally adjusted in the same manner as the first set of pulley driven belts discussed above. The speeds of the second set of pulleys 117, 119 and belts 121, 123 are run at a faster speed than the first set of pulleys 106, 107 and belts 108, 109 depending on the desired spacing at which the plurality of bottle containers are to be moved through the diverter assembly 16. In the preferred embodiment, the pulleys of the second set rotate at a twenty-five percent (25%) faster speed than the pulleys of the first set, although other speeds may be used to create different bottle spacings. At a twenty-five percent (25%) faster speed, the second set of pulleys creates a bottle spacing of a quarter bottle (¼ a bottle width) between adjacent bottles.

In both the first and second sets of belts and pulleys, the upper pulleys have slightly larger diameters than their associated lower pulleys. The upper belts engage the bottle containers at an upper portion of the containers and the lower belts engage the bottle containers at a lower portion of the containers. Because the upper belts are wrapped around larger diameter pulleys than the lower belts, but are mounted on common shafts, the upper belts have a slightly greater tangential velocity than the lower belts. This serves to properly position the bottle containers with the upper portion of each bottle container positioned slightly forward of the lower portion of the container as the containers are conveyed through the first and second sets of belts and pulleys to the diverter section 82 of the assembly 16.

Figure 3:
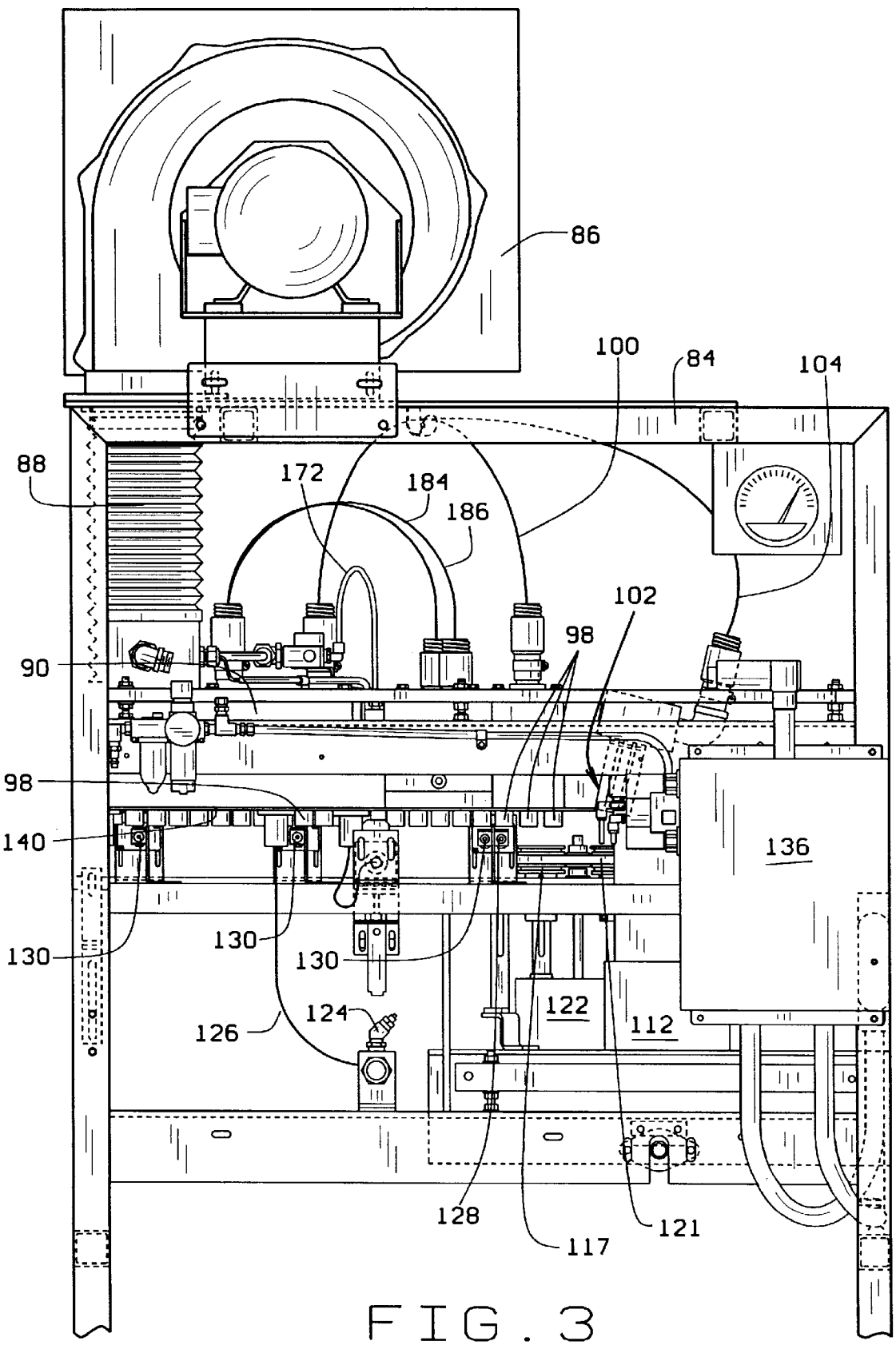
FIG. 3 is a left side elevation view of the diverter assembly.
Figure 4:
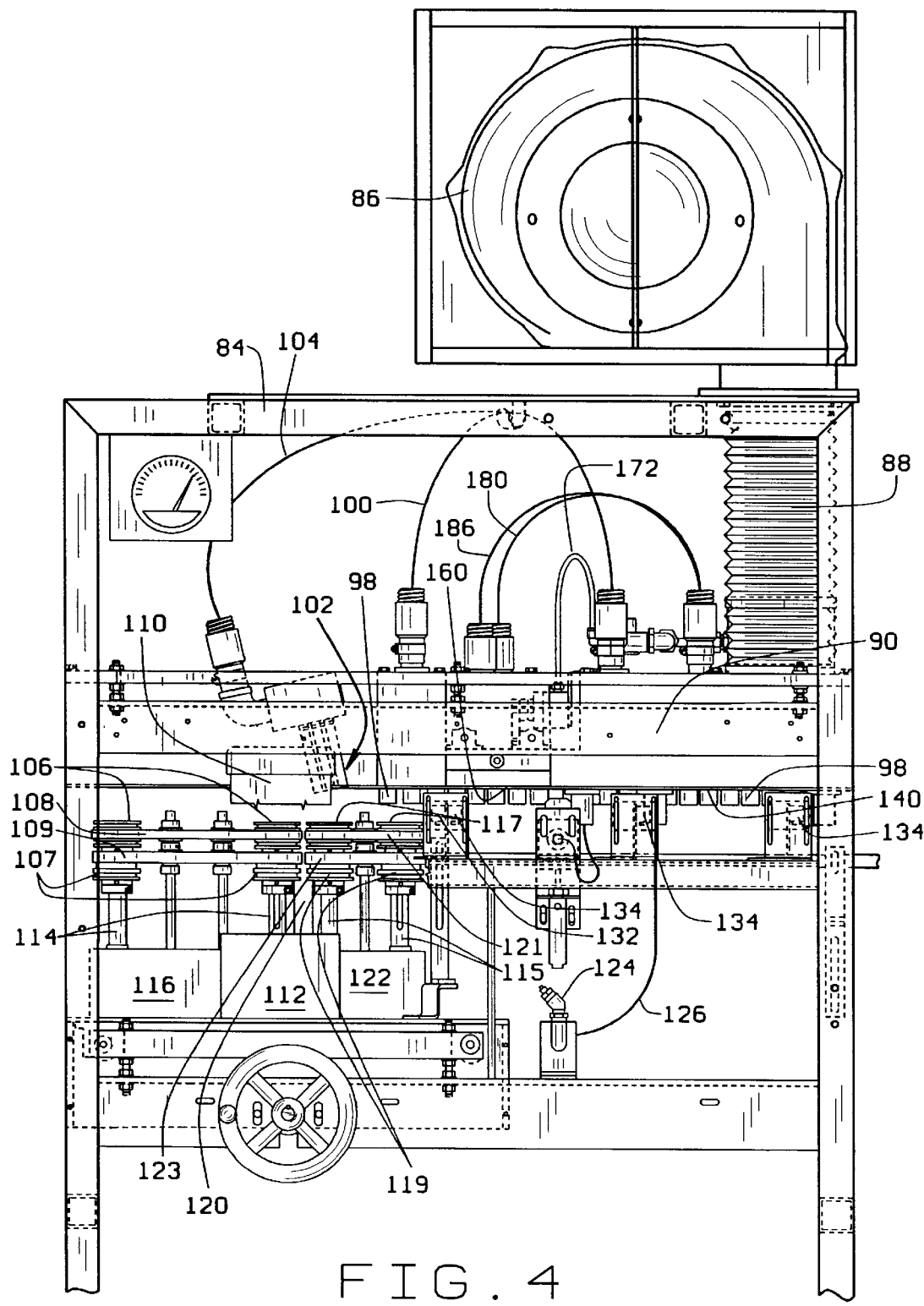
FIG. 4 is a right side elevation view of the diverter assembly.
Figure 5:
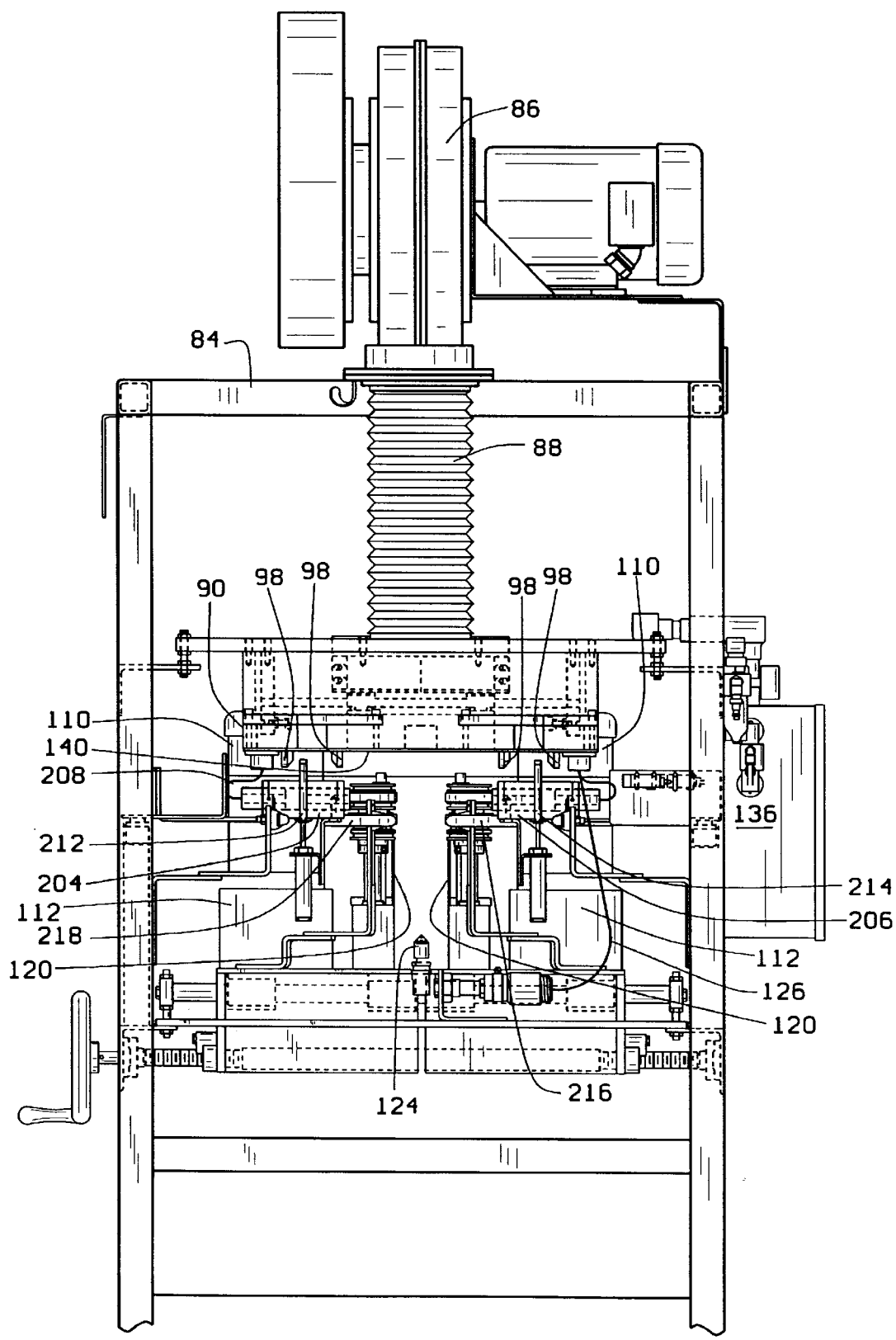
FIG. 5 is an end elevation view of the diverter assembly looking upstream of the conveyed path of bottle containers.

As best seen in FIGS. 3–5, an air jet 124 is positioned below the diverter section 82 with its jet directed rearward or in an upstream direction toward the feed slot 92. The lower air jet 124 is fed with pressurized air from the manifold 90 through a hose 126, shown schematically. In lieu of or in cooperation with the belts and pulleys, the jet of air ejected from this lower air jet 124 together with the jets of air ejected from the upper air jets 102 serve to properly orient the bottle containers conveyed through the feed slot prior to their ejection from the feed slot into the diverter section 82 of the assembly 16. The belts and pulleys and/or the air jets 102, 124 orient the bottle containers in the feed slot 92 with the neck or upper portion of the bottle containers oriented slightly forward or downstream of the bodies or bottom portions of the containers. It has been found that this particular orientation of the bottle containers as they enter the diverter section 82 of the assembly 16 prevents jamming of the containers in the diverter section 82.

A pair of photosensors 128, 130 are mounted on the left side of the frame 84 at the end of the feed slot 92 just prior to entry to the diverter section 82 of the assembly. A pair of reflectors 132, 134 are positioned on the right side of the frame opposite the photosensors 128, 130, respectively. The first photosensor 128 and its associated reflector 132 are employed in counting the bottle containers as they exit the feed slot 92. This photosensor communicates electronically with a control panel 136 of the diverter assembly which in turn communicates electronically with a computerized control (not shown) which monitor the number of bottle containers exiting the feed slot 92. With the information provided by the photosensor 130 and its associated reflector 134, the controls 136 of the diverter assembly 16 can automatically determine the existence of a jam of bottle containers. Alternatively, if desired, manual input to the controls 136 can vary the rate of the bottle containers. The adjacent photosensor 130 and its associated reflector 134 communicate electronically with the control panel 136 to monitor whether a jam of bottle containers occurs at the entry to the diverter section 82 of the assembly. Similar photosensors 130 and their associated reflectors 134 are also positioned along the flow path of bottle containers through the diverter section 82 and the output conveyor approach section 80 to determine if jams of bottle containers occur at these positions along the flow path of the containers. With a jam detected anywhere along the flow patch of containers through the diverter assembly 16, the controls 136 can automatically shut down the assembly so that the jam can be corrected.

The output approach section 80 of the diverter assembly 16 is basically comprised of a plate 140 supported under the air manifold 90 which is mounted below the frame 84. The plate 140 has a first output approach slot 142 formed therein with pairs of flanges 144, 146 on opposite sides of this first slot. The slot 142 and its opposed flanges 144, 146 are constructed in substantially the same manner as the slots disclosed in U.S. Pat. No. 5,437,521, referenced earlier. A second output approach slot 148 is also formed in the plate 140. This second slot 148 also has an opposed pair of flanges 150, 152 that are constructed in the same manner as the first output approach slot. The two output approach slots 142, 148 lead from the diverter section 82 of the diverter assembly 16 to the output air conveyors 12, 14 with the first approach slot 142 leading to the first output air conveyor 12 and the second output approach slot 148 leading to the second output air conveyor 14. The approach slots 142, 148 are aligned on their opposite sides with pluralities of air jet heads 98 which are substantially the same as the air jet heads disclosed in U.S. Pat. No. 5,437,521, except that their air jet openings are directed radially from the cylindrical configurations of the air jet heads. Each of the air jet heads 98 along the slots 142, 148 are oriented so that the air ejected from the heads conveys the bottle containers received from the diverter section 82 of the assembly along the slots to the two output air conveyors 12, 14. With each of the air jet heads 98 of the output approach section 80 connected to the underside of the manifolds 90, they receive their supply of pressurized air directly from the manifold.

The diverter section 82 of the assembly includes a diverter plate 160 having four cylindrical slide bushings 162 mounted to its top surface. Each of the slide bushings 162 are in turn mounted on a pair of parallel slide rods 164 that are secured at their opposite ends to the assembly framework 84. The slide rods 164 extending through the bushings 162 enable the diverter plate 160 to slide laterally across the rods 164. Abutments 166 are mounted to the assembly frame 84 and limit the extent to which the diverter plate 160 can slide. In the preferred embodiment of the invention, the total length of travel of the diverter plate 160 along the slide rods 164 is three inches. A bracket 168 is mounted to the top of the diverter plate 160 and is connected to a slide piston (not shown) contained inside a pneumatic cylinder assembly 170. A pair of piping sections 172 connect the opposite ends of the pneumatic cylinder assembly 170 to an electrically operated valve housing 174. The valve housing 174 is supplied with its own source of air pressure through the hose 176. The housing is also connected to a valve control box 178 by wiring 180. Feedback wiring 182 is also connected between the valve control box 178 and the cylinder assembly 170 providing the control box 178 with information on the instantaneous position of the piston (not shown) in the cylinder housing. The valve housing 174 is controlled by signals received from the control box 178 to selectively supply pressurized air from a supply hose 176 through one of the two piping sections 172 to one side of the cylinder housing while evacuating air from the opposite side of the cylinder housing through the other piping section. This selective supply of air to the opposite sides of the cylinder housing also supplies pressurized air to the opposite sides of the piston contained in the housing, causing the piston to reciprocate through the cylinder. On reciprocating movement of the piston in the cylinder, the bracket 168 is also reciprocated along the exterior of the cylinder housing 170 and in turn, the diverter plate 160 connected to the bracket is reciprocated along the slide rods 174 between first and second positions of the plate relative to the rods. In the first position of the plate 160 relative to the rods 164, the topmost abutment 166 shown in FIG. 1 engages against the side of the plate 160 and the plate is properly positioned relative to the feed section 78 and the output approach section 80 of the diverter assembly to divert container bottles from the feed section to the first output approach slot 142 of the output approach section 80. By operation of the valve housing 174 to reverse the supply of pressurized air to the cylinder housing 170 so that the air is supplied to the top of the cylinder housing as viewed in FIG. 1 and evacuated from the bottom of the housing, the piston in the housing is caused to travel downward as viewed in FIG. 1 causing the diverter plate 160 to slide along the rods 164 to its second position where the edge of the plate will engage with the lower abutment 166 shown in FIG. 1. In this second position of the diverter plate, it routes bottle containers from the feed section 78 of the diverter assembly to the second output approach slot 148 of the output approach section 80 of the assembly. The operation of the valve housing 174 selectively supplying and/or evacuating air to the two piping sections 172 communicating with the cylinder housing 170 is controlled by the control box 178 and may be automatically controlled or manually overridden.

The diverter plate 160 is hollow and acts as a plenum that supplies air pressure to a plurality of air jet heads 98 mounted to the underside of the plate. The air jet heads 98 mounted to the underside of the plate are arranged in three sections and three supply hoses 184, 186, 188 extend from the manifold 90 to the top of the diverter plate 160 and supply pressurized air to these three sections of air jet heads 98. Referring to FIG. 2 which shows the underside of the diverter plate 160, it is seen that the plate includes a first directional slot 190 having opposed flanges 192, 194 for supporting the annular ring of a bottle container, and a second directional slot 196 with similar opposed flanges 198, 200. The first and second directional slots 190, 196 are constructed in the same manner as the output approach slots 142, 148 and the air jet heads 98 that line the opposite sides of the directional slots 190, 196 are also constructed in a similar manner to the air jet heads 98 lining the output approach slots 142, 148 except that the air jet heads 99 in the middle have two orifices directed toward the two paths of the directional slots 190, 196. From FIG. 2, it can be seen that when the diverter plate 160 is controlled by the valve housing 174 and its control box 178 to move to its first position relative to the slide rods 164 supporting the plate, the first directional slot 190 is aligned with the feed slot 92 and the first output approach slot 142. In this position of the diverter plate, bottle containers conveyed through the feed section 78 of the diverter assembly will pass through the first directional slot 190 to the first output approach slot 142 where they subsequently will be fed to the first output air conveyor 12. On operation of the valve housing 174 to cause the diverter plate 160 to move to its second position relative to the slide rods 164 supporting the plate, the second directional slot 196 will align with the feed slot 92 and the second output approach slot 148. In this position of the diverter plate 160 relative to its slide rods 164, bottle containers conveyed through the feed sections 78 of the diverter assembly will pass through the second directional slot 196 to the second output approach slot 148 on their way to the second output air conveyor 14. The movement of the diverter plate 160 laterally across the diverter assembly between its first and second positions can be automatically controlled to redirect a single bottle container at a time to one of the two output approach slots 142, 148 and their associated output air conveyors, or can be controlled to direct pluralities of bottle containers at a time to one of the two output approach slots.

A pair of side jets 204, 206 are shown in FIG. 2 and can be seen in FIG. 5 of the drawing figures. These side jets assist in directing bottle containers passing through the directional slots 190, 196 of the diverter plate to the selected output approach slot 142, 148. The two side jets 204, 206 are supplied with pressurized air through hoses 208, 210 that communicate with the manifold 90. An electrically operated gate valve 212, 214 is positioned between each of the side jets 204, 206 and the hose 208, 210 supplying them with pressurized air. On selective operation of the gate valves 212, 214, jets of air can be ejected from the side jets 204, 206. The side jets are positioned so that an ejected jet of air will strike against the lower part of a bottle container passing through the diverter plate directional slots 190, 196 to move the bottom of the bottle container toward the chosen output approach slot 142, 148. For example, in the relative position of the diverter plate 160 to the feed section 78 and output approach section 80 of the assembly shown in FIG. 2, the lower gate valve 214 shown in FIG. 2 would be automatically operated to eject a jet of air that would strike against the body of a bottle container as it passes through the first directional slot 190 on its way to the first output approach slot 142 thereby ensuring that the body of the bottle container conveyed through the first directional slot 190 of the diverter plate follows the neck of the container passing through the slot on its way to the first output approach slot 142 of the output approach section 80. By providing the side jets 204, 206 to assist in redirecting the bottle containers to their selected output approach slots, jams in the diverter plate directional slots and in the output approach section slots are avoided. Also shown in FIG. 5 are pairs of side rails 216, 218 against which the bodies of bottle containers conveyed into the output approach slots 142, 148 may engage to prevent wobbling of the bottle containers as they pass through these slots and thereby prevent jamming of the containers.

With the apparatus of the invention described above, pluralities of bottle containers can be quickly conveyed from one location to another while avoiding jamming of the bottles in the air conveyors of the invention and also avoiding damage to the bottles due to high speed impact with bottles that have stopped or slowed. With the diverter assembly of the invention, the conveyed bottles can be quickly branched off to other air conveyor paths in an orderly and systematic manner.

While the present invention has been described by reference to a specific embodiment, it should be understood that modifications and variations of the invention may be constructed without departing from the scope of the invention defined in the following claims.

What is claimed is:

1. A conveyor for conveying containers, each container having an upper portion and a lower portion, the conveyor comprising:

a plurality of shafts, each shaft having at least two pulleys adjustably mounted thereon, said at least two pulleys being positioned to rotate in a substantially horizontal plane; and a plurality of belts each driven by a pair of pulleys, wherein said belts are looped around the pulleys, the belts being driven by the pulleys to engage the containers and convey the containers along the conveyor in a downstream direction;

said at least two pulleys on each shaft including an upper pulley and a lower pulley positioned on the shaft below the upper pulley;

said plurality of belts including a first upper belt guided by a first pair of upper pulleys and a first lower belt guided by a first pair of lower pulleys mounted on the same shafts as the first pair of upper pulleys, the first upper belt and first lower belt being positioned on one side of the containers as the containers are conveyed along the conveyor;

said plurality of belts including a second upper belt guided by a second pair of upper pulleys and a second lower belt guided by a second pair of lower pulleys mounted on the same shafts as the second pair of upper pulleys, the second upper belt and second lower belt being positioned on the opposite side of the containers as the first upper belt and first lower belt as the containers are conveyed alone the conveyor;

wherein the lower belts engage the containers at the lower portion of the containers and the upper belts engage the containers at the upper portion of the containers;

the upper pulley on each shaft having a larger diameter than the lower pulley on the same shaft so that the tangential velocity of the upper belts is greater than the tangential velocity of the lower belts.

2. A conveyor for conveying containers in a downstream direction, each container having a body including an upper portion and a lower portion below the upper portion, the conveyor comprising:

a pair of upper belts each guided by a pair of upper pulleys having a first diameter, the upper belts having a lateral spacing therebetween configured to receive and engage the upper portion of the body of the containers being conveyed; and a pair of lower belts positioned below the upper belts, each of the lower belts being guided by a pair of lower pulleys having a second diameter, the lower belts having a lateral spacing therebetween configured to receive and engage the lower portion of the body of the containers being conveyed.

3. The conveyor of claim 2 wherein the positions of the upper belts and lower belts are vertically adjustable for accommodating containers of various dimensions.

4. The conveyor of claim 2 wherein each pulley includes a set screw configured to secure the pulley to an associated shaft.

5. The conveyor of claim 4 wherein each shaft includes an elongated groove disposed lengthwise along the exterior of the shaft, and each pulley includes a key which is configured to engage the groove when the pulley is mounted on the shaft for preventing rotational movement of the pulley relative to the shaft.

6. The conveyor of claim 2 wherein the upper belts have a tangential velocity greater than the tangential velocity of the lower belts so that the containers are given a forward leaning orientation with the upper portion of the body of the container downstream of the lower portion of the body of the container as the containers are conveyed along the conveyor in the downstream direction.

7. The conveyor of claim 6 wherein the lower pulleys are mounted below the upper pulleys on the same shafts as the upper pulleys.

8. The conveyor of claim 7 wherein the upper belts have a tangential velocity greater than the tangential velocity of the lower belts because the first diameter is larger than the second diameter.

9. A conveyor for conveying containers in a downstream direction, the conveyor comprising:

a first upper belt guided by a first upper pulley and a second upper pulley;

a second upper belt spaced laterally from the first upper belt, the second upper belt being guided by a third upper pulley and a fourth upper pulley, each of said first, second, third and fourth upper pulleys having a first diameter, the first and second upper belts each being adapted for engaging an upper portion of the containers being conveyed;

a first lower belt positioned below the first upper belt, the first lower belt being guided by a first lower pulley and a second lower pulley; and a second lower belt spaced laterally from the first lower belt, the second lower belt being guided by a third lower pulley and a fourth lower pulley, each of said first second, third and fourth lower pulleys having a second diameter, the second diameter being different than the first diameter, the first and second lower belts each being adapted for engaging a lower portion of the containers being conveyed.

10. The conveyor of claim 9 wherein each of the first and second upper belts has a first velocity and each of the first and second lower belts has a second velocity, the second velocity being different than the first velocity.

11. The conveyor of claim 10 wherein the first velocity is greater than the second velocity so that the upper portion of each of the containers is conveyed at a greater velocity than the velocity at which the lower portion of each of the containers is conveyed.

12. The conveyor of claim 10 wherein the difference between the first velocity and the second velocity is sufficient to cause the containers to have a forward leaning orientation with the upper portion of each container positioned downstream of the lower portion of each container.

13. The conveyor of claim 9 wherein each of the first, second, third and fourth upper pulleys is mounted on a separate shaft, and wherein each of the first, second, third and fourth lower pulleys is mounted below one of the upper pulleys on the same shafts as the upper pulleys.

14. The conveyor of claim 9 wherein the positions of the upper and lower belts are vertically adjustable toward and way from each other for accommodating containers of various dimensions.

15. The conveyor of claim 9 wherein each pulley includes a set screw adapted to secure the pulley to an associated shaft.

16. The conveyor of claim 15 wherein each shaft includes an elongated groove disposed lengthwise along the exterior of the shaft, and each pulley includes a key which is configured to engage the groove when the pulley is mounted on the shaft for preventing rotational movement of the pulley relative to the shaft.

17. A conveyor for conveying containers in a downstream direction, the conveyor comprising:

a first shaft;

a first pulley mounted on the first shaft;

a second pulley mounted on the first shaft below the first pulley;

a second shaft spaced from the first shaft;

a third pulley mounted on the second shaft;

a fourth pulley mounted on the second shaft below the third pulley;

a third shaft;

a fifth pulley mounted on the third shaft;

a sixth pulley mounted on the third shaft below the fifth pulley;

a fourth shaft spaced from the third shaft;

a seventh pulley mounted on the fourth shaft;

an eighth pulley mounted on the fourth shaft below the seventh pulley;

a first belt looped around the first and third pulleys, the first belt being adapted for engaging an upper portion of the containers for conveying the containers in the downstream direction;

a second belt looped around the second and fourth pulleys, the second belt being adapted for engaging a lower portion of the containers for conveying the containers in the downstream direction;

a third belt looped around the fifth and seventh pulleys, the third belt being adapted for engaging the upper portion of the containers for conveying the containers in the downstream direction; and a fourth belt looped around the sixth and eighth pulleys, the fourth belt being adapted for engaging the lower portion of the containers for conveying the containers in the downstream direction;

wherein the first, second, third, fourth, fifth, sixth, seventh and eighth pulleys are sized so that the first and third belts have a greater velocity than the second and fourth belts, the first and third belts having a lateral spacing therebetween configured to receive and engage the upper portion of the containers being conveyed, and the second and fourth belts having a lateral spacing therebetween configured to receive and engage the lower portion of the containers being conveyed.

18. The conveyor of claim 17 wherein the first, third, fifth and seventh pulleys have a first diameter and wherein the second, fourth, sixth and eighth pulleys have a second diameter, the second diameter being smaller than the first diameter.

19. A conveyor for conveying containers in a downstream direction, the conveyor comprising:

a first shaft having a first set of pulleys mounted thereon, at least some of the pulleys in the first set of pulleys having different diameters;

a second shaft having a second set of pulleys mounted thereon, at least some of the pulleys in the second set of pulleys having different diameters, the second shaft being downstream from the first shaft;

a third shaft having at least one pulley mounted thereon, the third shaft being spaced laterally from the first shaft;

a fourth shaft having at least one pulley mounted thereon, the fourth shaft being downstream from the third shaft and being spaced laterally from the second shaft;

a first belt looped around one of the pulleys in the first set of pulleys and one of the pulleys in the second set of pulleys; and a second belt looped around the pulley on the third shaft and the pulley on the fourth shaft, the first and second belts having a lateral spacing therebetween dimensioned to receive the containers therebetween for conveying the containers in the downstream direction;

wherein the lateral spacing between the first and second belts is adjustable by selectively looping the first belt around different pulleys in the first and second sets of pulleys for accommodating containers of various dimensions.

20. The conveyor of claim 19 wherein the third shaft has a third set of pulleys mounted thereon, at least some of the pulleys in the third set of pulleys having different diameters, and wherein fourth shaft has a fourth set of pulleys mounted thereon, at least some of the pulleys in the fourth set of pulleys having different diameters, the second belt being looped around one of the pulleys in the third set of pulleys and one of the pulleys in the fourth set of pulleys, the lateral spacing between the first and second belts being adjustable by selectively looping the second belt around different pulleys in the third and fourth sets of pulleys for accommodating containers of various dimensions.

* * * * *